N. Jenkins.
Jig Saw.

No. 86,407. Patented Feb. 2, 1869.

Witnesses:
Wm. C. Dey
Frank A. Hadicke

Inventor:
N. Jenkins

UNITED STATES PATENT OFFICE.

NICHOLAS JENKINS, OF NEW YORK, N. Y.

Letters Patent No. 86,407, dated February 2, 1869; antedated January 18, 1869.

IMPROVEMENT IN SAWS.

The Schedule referred to in these Letters Patent and making part of the same.

*To all whom it may concern:*

Be it known that I, NICHOLAS JENKINS, of the city and county of New York, in the State of New York, have invented certain new and useful Improvements in Jig-Jaws, applicable also to general sawing; and I do hereby declare that the following is a full and exact description thereof.

By the machine for jig-sawing, in this specification, is intended a saw which is adapted to cut on curved or irregular lines, such as are required in the manufacture of chairs and other furniture, and in cutting the very crooked outline used for the margin of fret-work for pianos, church-organs, and the cottage style of architecture generally.

Flexible ribbons of steel, running bent around pulleys, and alternately assuming, first a straight and then a bent condition, have been toothed on one side, and made to perform the functions of a saw, while in the act of running, in a straightened condition, from one pulley to another; but this arrangement, though excellent in theory, is open to the serious objection that the alternate bending and straightening of the saw affects the structure of the metal, so that the saw is soon liable to break.

I employ a saw in the form of a ring, and drive it continuously in one direction. It operates, in this regard, like a circular saw, but differs therefrom in the fact that it is mounted differently, and will saw in crooked lines, which an ordinary circular saw will not; and it differs from the belt-saw in the fact that it is not required to bend in any direction, and its strength is not impaired by an indefinitely-prolonged use.

I will first describe what I consider the best means of carrying out my invention, and will afterward designate the points which I believe to be new.

The accompanying drawing forms a part of this specification.

Figure 2:
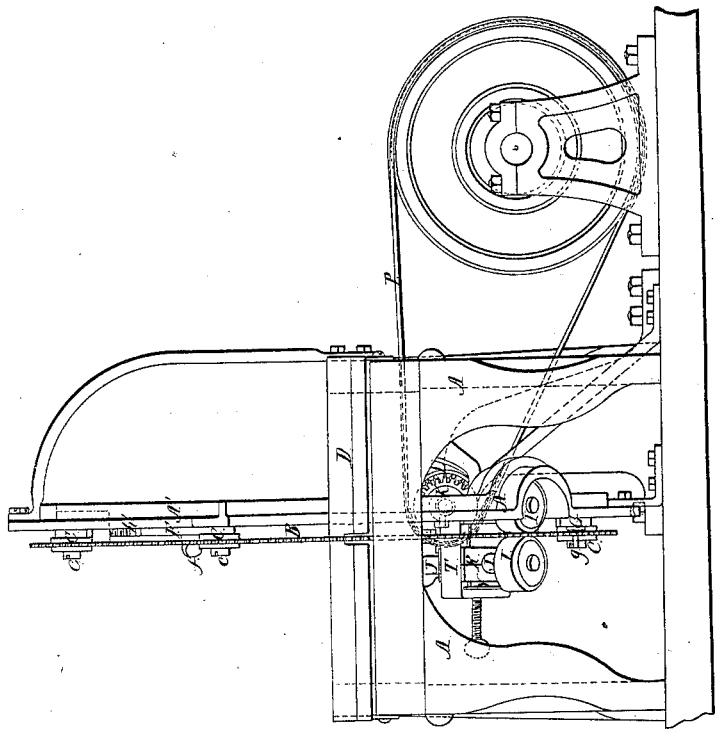
Figure 1:
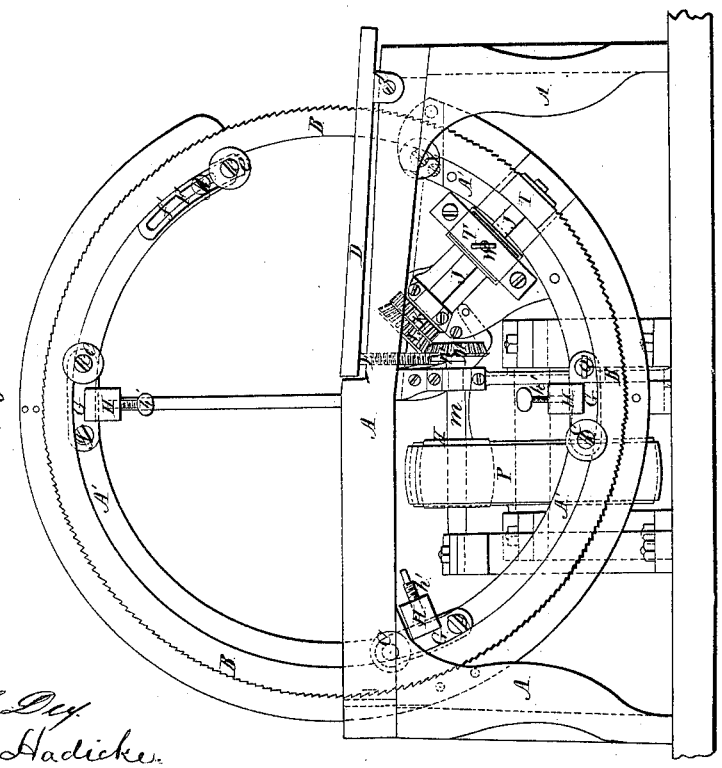

Figure 1 is a front elevation, and
Figure 2 is an end elevation of my saw and its connections.

Similar letters of reference indicate like parts in all the figures.

Tints are employed merely to aid in distinguishing parts, and do not indicate material.

The material of most of the novel parts may be iron and steel.

The main table, on which the frame-work is supported, and the adjustable table which I employ, may be made most conveniently of hard wood.

A A' is a fixed framing, the part A' being made, by preference, of a single casting of iron, and firmly supported in the position represented.

B is the annular saw. It is formed of a single piece, and may be made by cutting out the interior of a sheet of such steel as is ordinarily employed for circular saws of the same size. I believe that my peculiar method of mounting allows my saw to be made of much thinner material, and consequently to consume less power and waste less material, in its working, than a circular saw of the same diameter.

C C C C are grooved wheels mounted on pins $c$, as represented, and receiving the inner edge of the saw B in their grooves. These wheels C are supported at such points as to hold the saw B in position, and they revolve freely on their centres $c$ as the saw revolves.

D is an adjustable table, turning on pivots $d$, and adjusted by the thumb-screws E, so that its position may be inclined in one direction or the other, within considerable limits. The material to be sawed is supported on this table D, and the saw traverses continuously downward through the slot in this table, as will be obvious.

Before describing the means by which the saw receives its motion, I will describe the means by which the several wheels C are held in position, and thus support the saw.

The pivot of that wheel C which is nearest the point where the work is done, is carried in an adjustable piece, F, which is bolted to the rigid frame-work A' by means of the screw-bolt $f$, which passes through the long slot $f'$. This allows the supporting-wheel C to be shifted up and down, to allow the saw to operate on different thicknesses of stuff. I prefer to set this wheel as near the wood which is to be sawed as is practicable, without touching it. If the material to be sawed is very thin, the piece F is shifted downward until the upper end of the slot $f'$ is nearly down to the bolt $f$. If, on the contrary, the material is thick, the piece $f'$ is shifted up to such extent as is necessary.

The other three of the supporting-wheels C are mounted so as to be elastic. Each is carried on a lever, G, which turns on a centre, $g$, fixed on the frame A'. Each lever G, and its connected wheel, C, is urged outward by the pressure of a spring, of rubber or other suitable material, $h$, encased in the housing H, and acted upon by the screw $h'$, so that its tension may be increased or diminished at pleasure.

The elasticity in the means by which the supporting-wheels C are held out against the saw is important in more than one respect. It not only allows for the slight inequalities which are liable to exist in the form of the saw, but it allows the saw to change its diameter by the rise of temperature, and again to contract, by its cooling when stopped or when running idly, without ever being held too loosely or too tightly.

The saw is driven by friction.

I I are two cylinders, of steel or other suitable material, mounted on the shafts J J, and geared together by the spur-gear wheels K K.

On the end of one of the shafts J is a bevelled gear-wheel, L, which gears into another bevelled gear-wheel, M, which latter is mounted on a shaft, $m$, and is driven by a belt, P, which acts on the pulley N, and is driven by a steam-engine or other convenient power.

The shafts J J are carried in adjustable boxes R in the housing T, so that they may increase or diminish their distance apart V is a spring enclosed within the housing, and acted on by the set-screw W. This spring makes a yielding pressure, pressing the wheels I I forcibly together, and thus pinching the saw between them with sufficient force to impart motion thereto as the wheels I I are revolved.

The drawing indicates with sufficient clearness, without description, the means by which the several driving-parts may be supported in position; but these supporting-brackets, and the like details of the frame-work, may be varied indefinitely, without materially affecting the operation of my invention.

It will be obvious that the saw should be supported with the most firmness at the point where it is to be effective, that is to say, immediately above and adjacent to the table D.

The supporting-wheel C, which is next above the table D, is supported rigidly by the adjustable piece described.

Close below the adjustable table D is another supporting-wheel, not before described, and which I have marked X. This is also, by preference, supported rigidly.

One or more of the supporting-wheels C, as also the supporting-wheel X, may be driven by the aid of a belt, or an equivalent connection to the driving-means, so as to aid in imparting motion to the saw, if it be found necessary or desirable.

I can, if preferred, make the bottom of the groove in each of these wheels with teeth, and can correspondingly tooth the inner edge of the saw, so that the contact shall be not merely frictional, but shall be analogous to that of ordinary tooth-gearing; but I do not consider any such device necessary. Experiment has confirmed my opinion that I can impart sufficient force by friction applied on the face of the narrow saw, in the manner which I have above described.

It will be obvious that I can duplicate the frictional driving-means to any extent desired. Thus I can, if necessary, in operating with large saws, employ driving-means I I and their connections, not only below the table D, but also above it, and at any other points in the circle which may seem desirable. For small saws, I believe one pair of driving-wheels I I will be found sufficient.

It is not absolutely necessary that the teeth be upon the outer edge of my saw. I can operate successfully by placing the teeth on the inner edge, and mounting the several guide-rollers so as to press against and steady the saw by its outer edge.

Some of the advantages of my invention may be realized by adopting the same general arrangement of parts which I have here represented, and introducing a saw which is in the form of a hoop, or a crown-saw, instead of the annular form of my saw B.

Such a saw, if made sufficiently rigid to avoid bending, and if supported by the means which I have described, above and below the wood, and elastically supported at other points in its periphery, so as to maintain its circular form, would saw with great rapidity and perfection, and would endure for a long period.

It would be necessary, in the use of such a saw, not to strike the teeth with the edge of the groove in which the saw is carried in the several guide-rollers. This could be avoided by hanging the guide-rollers slightly oblique to the path, so as to make them always tend to carry the saw toward the other edge or back of the saw, thus insuring that the saw would always press against the other side of the groove. It would be, in fact, practicable to dispense with grooved guide-rollers entirely, and to employ rollers in which a guiding-flange should be employed on one side only, the guiding-flange to press against the back of the saw.

I am referring to these modifications only to show that their practicability has been studied. I much prefer the form of saw represented in the figures.

Some of the advantages due to certain features of my invention may be separately enumerated as follows:

First. By reason of the fact that my ring-saw B is a ring-saw, and that my framing A A' steadies the supports thereof firmly, while allowing a free turning of the material being sawed, I am able to use the device as a jig-saw, and to cut in curves with greater speed than has ever been heretofore possible.

Second. By reason of the fact that my framing A' carries a guide-roll, C, on the adjustable piece F, close to the point where the ring-saw B enters the wood, I am able to guide it definitely when sawing wood of every variety of thickness, and thus to cut with more truth and smoothness than would be otherwise possible.

Third. By reason of the fact that my table D, through which my ring-saw B runs, tilts on its axis $d$, and may be held at different angles by the screw E, I am able to so present wood of different thicknesses to the ring-saw, that the plane of its centre shall be at right angles thereto, and thus to hold it in the best position for cutting, allowing it to be turned and manipulated in all respects as if on a table, mounted at right angles to a common reciprocating jig-saw.

Fourth. By reason of the fact that the grooved guide-wheels C are mounted elastically, I am able to guide the jig-saw efficiently, and with adequate steadiness, while allowing for the defects of workmanship, and for the expansion and contraction due to changes of temperature.

Fifth. By reason of the fact that my friction-driving rolls I I are mounted elastically by means of the spring V, I am able to act on the opposite faces of the ring-saw with sufficient power to drive it forcibly and with absolute certainty, while allowing for all ordinary irregularities in the thickness, and by reason of the fact that the tension or gripe thus elastically afforded is adjusted by the screw W, I can adapt the machine at once to a saw of a different thickness when an exchange is made.

I do not claim, in itself, a ring-saw, as that has been shown in the patent to R. Grant, issued in 1838; neither do I claim a tilting or adjustable table, an adjustable guide, guide-wheels, or drive-rolls, except in the combinations hereinafter set forth; but having now fully described my invention,

What I claim as new therein, and desire to secure by Letters Patent, is as follows:

1. I claim the ring-saw B and framing A A', constructed, combined, and arranged as herein set forth.

2. I claim the ring-saw B, adjustable guide F, guide-roll C carried therein, and framing A A', constructed, combined, and arranged as herein set forth.

3. I claim the ring-saw B, framing A A', adjustable tilting-table D, axis $d$, and adjusting-means E, constructed, combined, and arranged as herein set forth.

4. I claim the springs, mounted in the housing H, and acting on the levers G, and grooved wheels C, or their equivalents, so as to elastically guide the ring-saw B, and to allow for the inequalities in workmanship, and the expansion and contraction of the saw, due to changes of temperature, all substantially as herein set forth.

5. I claim the ring-saw B, driving-rolls I I, spring V, and screw W, or its equivalent, constructed, combined, and arranged as herein set forth.

In testimony whereof, I have hereunto set my hand, in the presence of two subscribing witnesses.

N. JENKINS.

Witnesses:
 W. C. DEY,
 FRANK A. HADICKE.